United States Patent [19]

Kocot

[11] Patent Number: 4,571,597

[45] Date of Patent: Feb. 18, 1986

[54] ELECTROSTATIC INK JET SYSTEM WITH POTENTIAL BARRIER APERTURE

[75] Inventor: Raymond H. Kocot, Danbury, Conn.

[73] Assignee: Burroughs Corp., Detroit, Mich.

[21] Appl. No.: 707,524

[22] Filed: Mar. 4, 1985

Related U.S. Application Data

[63] Continuation of Ser. No. 487,268, Apr. 21, 1983, abandoned.

[51] Int. Cl.[4] .......... G01D 15/18

[52] U.S. Cl. .......... 346/75; 346/140 R

[58] Field of Search .......... 346/75, 140

[56] References Cited

U.S. PATENT DOCUMENTS

| | | | |
|---|---|---|---|
| 3,060,429 | 10/1962 | Winston | 346/75 X |
| 3,341,859 | 9/1967 | Adams | 346/140 |
| 3,596,285 | 7/1971 | Gottwald | 346/75 |
| 3,810,194 | 5/1974 | Tokunaga | 346/75 |
| 3,887,928 | 6/1975 | Ohno | 346/75 X |
| 3,893,126 | 7/1975 | Ascoli | 346/75 X |
| 4,263,601 | 4/1981 | Nishimura | 346/140 X |
| 4,314,263 | 2/1982 | Carley | 346/75 X |
| 4,315,267 | 2/1982 | Sonoda | 346/140 X |
| 4,346,387 | 8/1982 | Hertz | 346/75 X |
| 4,404,573 | 9/1983 | Kocot | 346/75 X |

*Primary Examiner*—Joseph W. Hartary

*Attorney, Agent, or Firm*—Mark T. Starr; Kevin R. Peterson

[57] ABSTRACT

Disclosed is an improved electrostatic ink jet printing system which provides a potential barrier to block static charges built up on a recording medium from influencing the electric field which draws a liquid imaging material from an ink jet nozzle to the recording medium. The system's ink jet nozzle is supplied with a liquid imaging material at a hydrostatic pressure such that a meniscus of the imaging material forms at the tip of the ink jet nozzle. A conductive platen is positioned in front of the exit oriface of the ink jet nozzle and the recording medium is interposed between the conductive platen and the tip of the ink jet nozzle. A potential difference is applied between the platen and the ink jet nozzle in order to generate the electric field. The potential barrier is effected by providing a conductive plate having an aperture between the recording member and the ink jet nozzle, the platen and plate maintained at an identical potential level. The plate serves to block charges built up on the recording medium from influencing the electric field between the plate and the ink jet nozzle. Once the liquid imaging material has been drawn through the aperture, it has gained sufficient momentum such that it is not effected by the static charges built up on the recording medium.

Also disclosed is an alternate embodiment of the invention incorporating a plurality of ink jet nozzles and a corresponding number of potential barrier shields. In addition to blocking each nozzle from static charges built up on the recording medium, each shield serves to isulate the electric field generated between the platen and its respective nozzle from the influence of an electric field generated between the platen and one or more adjacent ink jet nozzles.

32 Claims, 5 Drawing Figures

ELECTROSTATIC INK JET SYSTEM WITH POTENTIAL BARRIER APERTURE

This is a continuation of co-pending application Ser. No. 487,268, filed on Apr. 21, 1983, now abandoned.

BACKGROUND OF THE INVENTION

1. Field of the Invention

This invention relates in general to an apparatus which records images by jetting a liquid imaging material in a controlled manner. More particularly, this invention relates to an apparatus for depositing ink on a receiving surface by electrostatic generation of intermittent jetting of the ink in response to a signal.

2. Description of the Prior Art

In the past, there have been numerous attempts to effect non-impact printing by positioning a conductive platen behind a sheet of recording media such as paper, and then generating a jet of ink in front of the paper and attracting the ink to the platen by an electrostatic field, thereby attracting the ink to the paper. Examples of such prior art techniques may be found in U.S. Pat. Nos. 3,060,429 and 3,341,859, and in pendng U.S. patent application Ser. No. 334,840, now U.S. Pat. No. 4,404,573 filed Dec. 28, 1981 for An Electrostatic Ink Jet System and assigned to the same assignee as the present application.

In one type of prior art system, a rotating drum serves as the platen, the paper being mounted on the outside of the drum. An ink jet nozzle is positioned a distance from the drum's surface. The drum is held at a reference ground level and a potential is applied to the ink jet to create an electric field which draws ink from the jet nozzle onto the paper.

The latter described system's potential difference is subject to two factors which disturb the electric field necessary to draw the ink to the paper. The first factor is inherent drum eccentricity and wear of the system's mechanical parts which may cause the distance between the drum surface and jet to change. Such a distance change can cause the electric field between the jet and the drum to vary as the drum rotates. Since the maintenance of consistent copy quality requires a constant electric field, these systems are subject to changing print quality as the components wear.

Problems in maintaining a constant electric field are also experienced due to wear in prior art systems employing a flat bed platen.

The electric field created between the platen and ink jet is also subject to variation due to charges which build up on the printing medium or paper. In general, paper is not a good conductor of electricity. Hence, when a charge is induced or delivered to the paper, its potential is raised. Since the paper serves as a reference (ground) voltage, a change in its potential will affect the electric field created when a potential is applied to the ink jet or ink.

The paper's potential can be changed in two undesirable ways. First, static (triboelectric) charges of 500-1000 volts can be induced on the paper due to natural causes such as environment. As the voltage signal applied to the jet nozzle is typically 2000 volts with a 1000 volt data signal added, the static charges can totally overcome the data signal resulting in a condition known as fading.

Second, the paper's potential may be changed as a result of depositing ink on the paper. The delivery of ink is caused by charges within the ink being accelerated by the electric field. These charges are delivered to the paper along with the ink. The paper's poor conducting characteristics do not allow the paper to discharge. As a result, these charges cause the reference voltage to increase, this change in reference voltage changing the electric field created when the potential difference is applied between the platen and jet nozzle. Again, this change in electric field can result in fading.

It is the general object of the present invention to overcome these and other drawbacks of the prior art by providing an electrostatic ink jet printer which delivers a jet of ink from an ink jet nozzle to a printing surface in a controlled manner.

It is another object of the present invention to provide an electrostatic ink jet printer which minimizes the effect of stray or unwanted electrostatic charges on the platen side of the printer.

It is still another object of the present invention to provide an electrostatic ink jet printer which includes a potential barrier which blocks static charges on the printing medium from affecting the electric field created by the application of a potential difference between the printer's ink jet and platen.

It is a further object of the present invention to provide a low cost ink jet electrostatic printer which requires the application of a potential only to the printer's ink jet nozzle.

These and other objects and advantages of the present invention will become more apparent from reading the following detailed description of the invention in conjunction with the drawings provided.

SUMMARY OF THE INVENTION

In accordance with the invention, an ink jet nozzle is conductively connected to an ink reservoir containing conductive ink. A conductive platen maintained at a reference (or ground voltage level) is positioned in front of the ink jet nozzle. A sheet of paper or other printing medium is positioned on the surface of the platen facing the ink jet nozzle. Positioned between the paper and the ink jet nozzle is a conductive plate having an aperture through which the ink jet emanating from the nozzle is directed. The plate blocks charges on the paper from influencing an electric field that will be created between the platen and the nozzle.

The plate and platen are electrically interconnected so they are maintained at the same voltage level. When a potential difference is applied to the ink jet nozzle, an electric field is created between the platen and the nozzle to attract a filament of the ink from the jet through the plate's aperture and onto the paper. Once the filament of ink passes through the aperture, the momentum the ink obtained is sufficient to carry the ink to the paper without significant effect due to the static charges on the paper.

Also disclosed is an alternate embodiment wherein each of a plurality of adjacent ink jet nozzles is provided with a cylindrical shield in place of the plate, the end of each one of the shields closest to the nozzle being open, the other end of each of the shields having an aperture. In addition to providing all benefits of the plate, the shields serve to insulate each jet nozzle from the influence of adjacent jet nozzles.

DETAILED DESCRIPTION OF THE INVENTION

Figure 1:
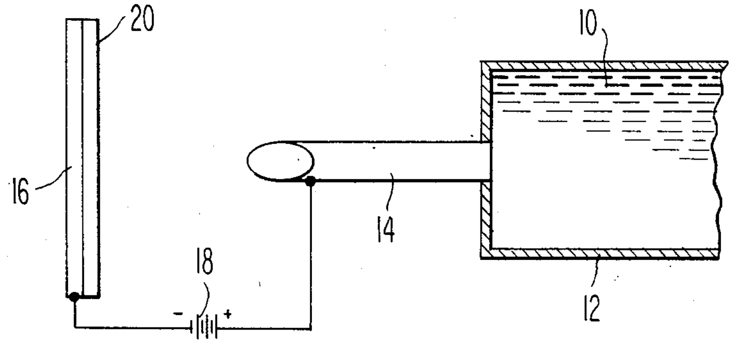
FIG. 1 is a top plan view, with portions broken away, of a prior art electrostatic ink jet printing system.

Referring first to FIG. 1, shown is a prior art electrostatic ink jet printer. The ink supply 10 is contained in an ink reservoir 12. The ink reservoir 12 may be formed from a moldable material such as polypropylene which is resistent to chemical reaction with the ink 10. The ink jet nozle 14 is fabricated from stainless steel hypodermic-type tubing. The head height of the ink 10 is chosen to provide sufficient pressure to the nozzle 14 to form a bulge or convex meniscus at the end of the nozzle 14, but not sufficient to produce a flow of ink 10 out of the nozzle 14.

In the prior art configuration, an electrostatic field is established between the nozzle 14 and a conductive platen 16 which is positioned opposite the exit of the nozzle 14, by applying a potential difference 18 between the platen 16 and nozzle 14, whereby the ink 10 is drawn out and the bulge will be drawn into an elongated shape having a tip from which a fine ray-like jet is drawn toward the platen 16. This will result in a jet of ink 10 being directed from the nozzle 14 toward the platen 16, approximately in a direction normal to the surface of the platen 16. If a sheet of paper 20 or strip of paper or other recording medium is placed against the platen 16, a line may be drawn on the tape or sheet 20 if the sheet 20 is moved along the platen 16. Interruption of the jet may be effected by reducing the potential difference 18 between the platen 16 and the nozzle 14, and consequently, marks of controlled length may be made on the sheet of paper 20.

Figure 2:
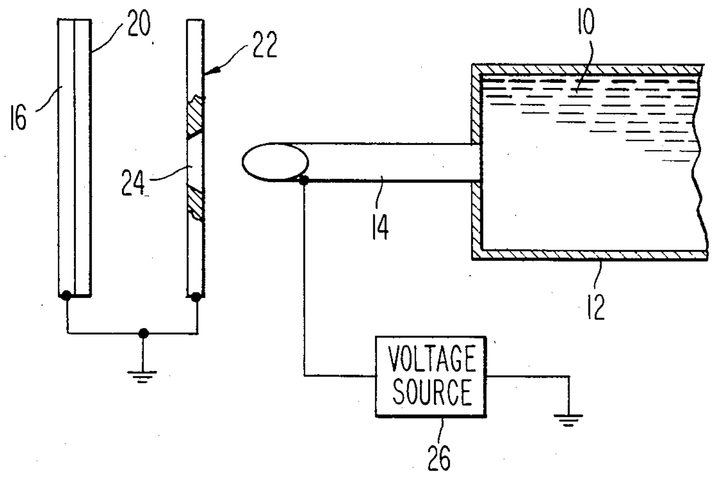
PRIOR ART Fig.2
FIG. 2 is a top plan view, with portions broken away, of the ink jet printing system of the present invention.
Figure 4:
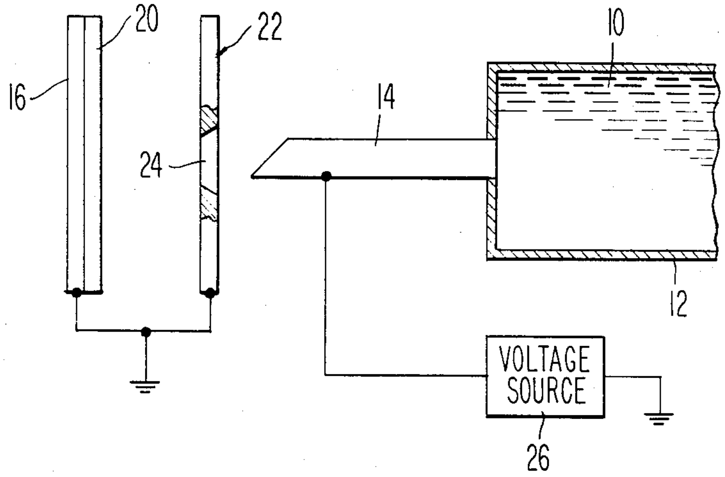
FIG. 4 is a side plan view of the ink jet printing system of FIG. 2.

As previously discussed, the prior art system of FIG. 1 is susceptible to "fading" due to charges which build up on the paper 18, thereby disturbing the electric field produced when the potential difference 18 is increased to a level where jetting will occur. Shown in FIGS. 2 and 4 are top and side view of the improved system of the present invention which eliminates the fading problem of the prior art system. In FIGS. 2 and 4, components having identical reference characters to those shown in FIG. 1 are identical to the corresponding components in FIG. 1.

The present invention overcomes the fading problems by providing a metallic plate 22 having a hole 24 (or aperture) positioned between the nozzle 14 and platen 16. The plate 22 is positioned so that the ink jet from nozzle 14 passes through the aperture 24. The plate 22 and platen 16 are electrically interconnected so that they are maintained at the same potential. In the preferred embodiment of the invention, the platen 16 and plate 22 are both held at a ground (or zero) voltage level.

Figure 3:
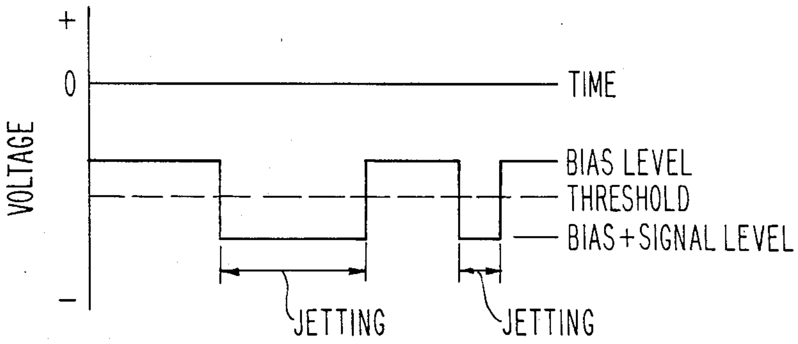
FIG. 3 shows the voltage signal and added data signal that is applied to the ink jet nozzle of the present invention.

In order to create the potential difference, a voltage source 26 is connected to the nozzle 14. The voltage levels supplied by the voltage source are shown in FIG. 3. In the preferred embodiment, a negative bias voltage level (typically in the range of 1800 to 2200 volts) is always applied to the nozzle 14. This bias voltage is above the threshold level where jetting will occur. When jetting is desired, the voltage source 26 lowers the voltage applied to nozzle 14 below the threshold level (to a level typically in the range of 2800 volts to 3200 volts negative with respect to ground) to create an electric field sufficient in size to cause jetting. It accomplishes this by adding a negative signal voltage to the negative bias voltage. The duration of the jet is controlled by the amount of time that the applied voltage level remains below the threshold level. Interruption of the jet is effected by the voltage source removing the signal voltage, thereby reducing the potential difference below the threshold level.

Those skilled in the art will appreciate that alternately the potential difference may be applied to a conductive member within the ink supply, the ink jet nozzle being connected to the ink supply.

It should be noted that the bias and signal levels are utilized in order to reduce cost and increase response time. Thus, it is less expensive to produce a voltage source 26 which switches between the bias and (bias+signal) levels than one that switches between a zero voltage level and a (bias+signal) level. Also, the response time to switch the voltage sources 26 output from the bias level to the (bias+signal) level is less than the time that would be required to switch between a zero voltage and a (bias+signal) level.

When the voltage source 26 is switched to a supply level below the threshold level, the electric field between the nozzle 14 and platen 16 is increased in strength to a level whereby the ink 10 is drawn out of the nozzle 14 tip in the form of a ray-like jet which is drawn toward the platen 16.

As previously discussed, the plate 22 serves as a potential barrier which blocks stray charges built up on the paper 20 from influencing the electric field between the nozzle 14 and the plate 22. The plate 22 is positioned so that the ink jet passes through the aperture 24 on its way to the paper 20. Once the ink jet passes through the aperture 24, the ink 10 has gained sufficient momentum such that its original path of travel will not be altered by the influence of the stray charges built up on the paper 20.

In the preferred embodiment, a stainless steel hypodermic-type ink jet nozzle 14 is utilized. As shown in FIG. 4, the lower portion of the nozzle 14 tip extends beyond the upper portion, the lower portion seving to support the ink 10 meniscus. In practice, optimum results have been obtained using a short nozzle of approximately 0.070 inch, with an inside diameter of approximately 0.015 inch. Best results are obtained when the distance between the nozzle 14 tip and the plate 22 is in the range of 0.060–0.120 inch and the distance between the plate 22 and the platen 16 is approximately 0.030 inch. An aperture 24 diameter in the range of 0.020–0.20 inch is utilized. In the preferred embodiment, the outer shape and size of the plate 22 is chosen to match the surface area of the platen 16.

Plain paper is utilized with the present system, such paper having a resistivity of less than $10^{14}$ ohm-centimeters.

The characteristics of the conductive ink 10 will depend on many factors, including the head pressure of the ink 10. The tradeoffs made based on the type of ink 10 utilized will be apparent to one of ordinary skill in the art.

In the preferred embodiment, the bias voltage level applied to the nozzle 14 is approximately −2000 volts with respect to the ground reference level that the platen 16 and plate 22 are maintained at. A signal level of about −800 volts is added to the bias level to effect jetting, the threshold level being between 2000 and 2800 volts.

Figure 5:
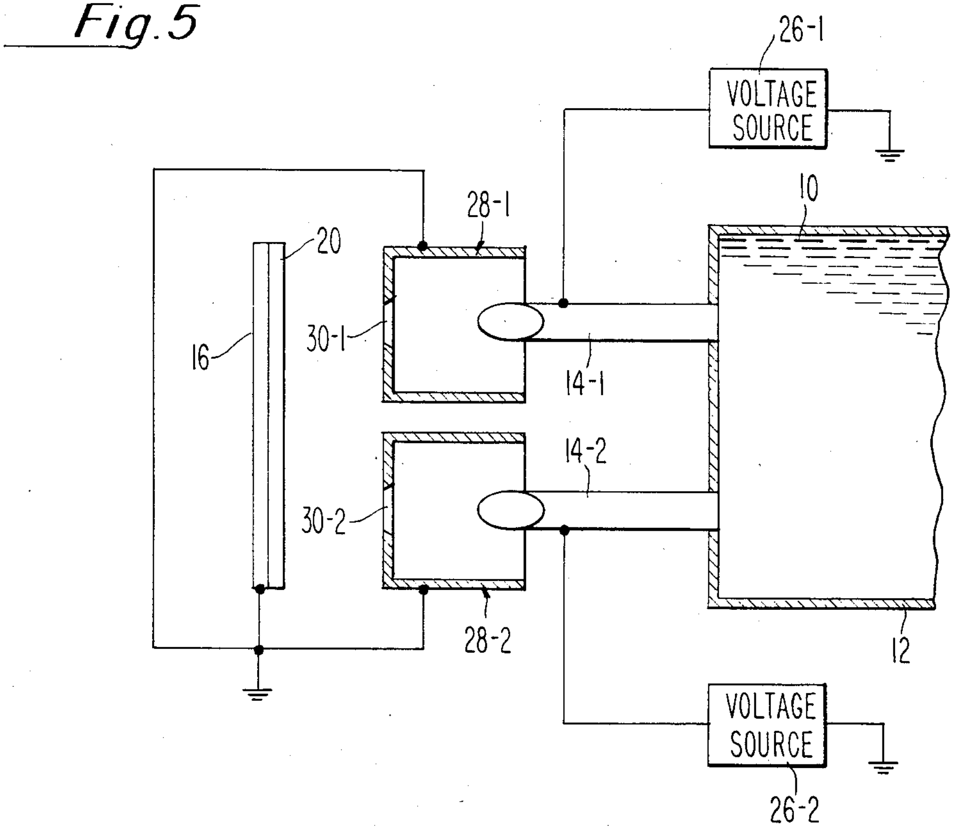
FIG. 5 shows the alternate embodiment of the present invention wherein a plurality of adjacent ink jet nozzles are each provided with a cylindrical shield.

FIG. 5 shows an alternate embodiment of the present invention. In such an embodiment, two or more individually controlled ink jet nozzles 4-1, 2 are utilized to simultaneously print two or more lines. In the prior art, systems employing multiple, individually controlled ink jet nozzles 14-1, 2 are known. In addition to experiencing the previously discussed fading due to charges building up on the paper 20, such prior art systems are susceptible to additional problems when adjacent jet nozzles 28-1, 2 are simultaneously actuated. Thus, the electric field created when a first potential difference is applied between the platen 16 and a first jet nozzle 14-1 may be altered when a second potential difference is applied between the platen 16 and a second adjacent jet nozzle 14-2.

The system of FIG. 5 includes two or more jet nozzles 14-1, 2, supplied by a common ink reservoir 12. A potential difference sufficient to cause jetting is applied independently between each nozzle 14-1, 2 and the platen 16 by each of two separate voltage sources 26-1, 2, respectively.

In place of the plate 22, utilized in the primary embodiment, each nozzle 14-1, 2 has its own hollow cylindrical metal shield 28-1, 2 positioned in front of the respective nozzle 14-1, 2. Each shield 2-1, 2 has a hole (or aperture) 30-1, 2 respectively passing through the otherwise closed end of the cylindrical shield closest to the platen 16. The end of each shield 28-1, 2 closest to the respective nozzle 14-1, 2 is entirely open. The open end of the shield may be positioned as shown in FIG. 5 or may be moved closer to or farther away from the platen 16, the optimum position dependent on the distance between the platen 16 and jet nozzles 14-1, 2, the magnitude of the electric fields and other factors.

Each shield 28-1, 2 is vertically positioned so that the ink jet from its respective nozzle 14-1. 2 will pass through its respective aperture 30-1, 2. The shields 28-1, 2 provide all previously discussed advantages of the plate 22 utilized in the primary preferred embodiment. In addition, they provide a potential barrier which blocks the electric field applied between the platen 16 and one of the nozzles 14-1, 2 from influencing the field between the platen 16 and the other one of the nozzles 14-1, 2. In all other rspects, the system of FIG. 5 functions as two independent systems of the type disclosed in FIGS. 2 and 4.

Having shown and described the preferred and alternate embodiment of the present invention, I state that the subject matter which I regard as being my invention is particularly pointed out and distinctly claimed in the following claims. Those skilled in the art to which the present invention pertains will appreciate that equivalents or modifications of, or substitutions for, parts of the specifically described embodments of the invention may be made without departing from the scope of the invention as set forth in what is claimed.

What is claimed is:

1. An ink jet printing system comprising:

an ink jet nozzle coupled to a reservoir containing a liquid imaging material, said reservoir for supplying said nozzle with said liquid imaging material;

a conductive platen positioned in spaced relation to said ink jet nozzle;

a recording member interposed between said platen and said ink jet nozzle;

potential difference means, connected between said ink jet nozzle and said platen, for applying a high voltage potential difference between said ink jet nozzle and said platen to thereby create an electric field sufficient to generate a jet of said liquid imaging material from said ink jet nozzle; and potential barrier means, positioned in spaced rlation between said recording member and said ink jet nozzle, for blocking charges built up on said recording member from influencing the electric field.

2. The ink jet printing system in accordance with claim 1 wherein said potential barrier means includes a conductive plate having an aperture, the aperture in said plate positioned in alignment with the jet of said liquid imaging material drawn from the nozzle such that said jet of liquid material passes through said aperture and flies towards said recording member.

3. The ink jet printing system in accordance with claim 1 wherein:

said first voltage level is within the range of approximately 1800 to 2200 volts negative with respect to a ground potential; and said second voltage level is within the range of approximately 2800 to 3200 volts negative with respect to said ground potential.

4. The ink jet printing system in accordance with claim 1 wherein said conductive platen and said conductive plate are both flat, and both have the same size and shape.

5. The ink jet printing system in accordance with claim 1 wherein said reservoir supplies said liquid imaging material to said ink jet nozzle at a hydrostatic pressure such that a meniscus of said liquid imaging material will form at the tip of said ink jet nozzle.

6. The ink jet printing system in accordance with claim 3 wherein:

said plate is spaced from the ink jet nozzle a distance of between approximately 0.060 and 0.120 inch;

said platen is spaced from said plate a distance of approximately 0.030 inch; and said aperture is circular in shape and has a diameter of between approximately 0.02 and 0.20 inch.

7. An ink jet printing system comprising:

a plurality of adjacent ink jet nozzles, coupled to a reservoir containing a liquid imaging material, said reservoir for supplying said plurality of ink jet nozzles with said liquid imaging material;

a conductive platen positioned in spaced relation to said plurality of ink jet nozzles;

a recording member interposed between said conductive platen and said plurality of ink jet nozzles;

potential difference means for applying a high voltage potential difference between at least one of said ink jet nozzles and said platen to thereby create an electric field sufficient to generate a jet of said liquid imaging material from said at least one of said ink jet nozzles; and a plurality of shielding means corresponding in number to the plurality of ink jet nozzles, each one of said shielding means positioned in spaced relation between said recording member and a corresponding one of said plurality of adjacent ink jet nozzles, each of said shielding means for providing a potential barrier to an electric field between said adjacent ink jet nozzles and said platen and further for providing a potential barrier to static charges built up on said recording member.

8. The ink jet printing system in accordance with claim 7 wherein each one of said plurality of shielding means and said platen is maintained at an identical potential level.

9. The ink jet printing system in accordance with claim 7 or 8 wherein each one of said plurality of shielding means includes a conductive cylinder, one end of said cylinder having an aperture passing through it, the other end of said cylinder being open, the length of each one of said cylinders being roughly the same as its diameter.

10. The ink jet printing system in accordance with claim 9 wherein each one of said conductive cylinders is positioned with its open end closest to the oriface of its respective ink jet nozzle, said aperture in alignment with the jet of said liquid imaging material drawn from the oriface of its respective ink jet nozzle.

11. The ink jet printing system in accordance with claim 7 wherein said platen and each of one of said plurality of shielding means is maintained at a ground potential level and said potential difference means applies a potential difference in the range of approximately 2800 to 3200 volts negative with respect to said ground potential level between said at least one of said ink jet nozzles and said platen.

12. The ink jet printing system in accordance with claim 7 or 11, wherein said potential difference means applies one of two non-zero voltage levels to said at least one of said ink jet nozzles, the first one of said two voltage levels being insufficient to cause jetting of said liquid imaging material from said at least one of said ink jet nozzles, the second voltage level being sufficient to cause jetting of said liquid imaging material from said at least one of said ink jet nozzles to said recording member.

13. The ink jet printing system in accordance with claim 11 wherein each one of said plurality of shielding means includes a conductive cylinder, one end of said cylinder having an aperture passing through it, the other end of said cylinder being open, said open end positioned in front of and opposite the orifice of its respective ink jet nozzle, said aperture in alignment with the jet of said liquid material drawn from the orifice of its respective ink jet nozzle.

14. The ink jet printing system in accordance with claim 1 wherein said potential difference means applies said high voltage potential difference sufficient to generate said jet only at times when it is desired to deposit the liquid imaging material on the recording member.

15. The ink jet printing system in accordance with claim 1 wherein said potential barrier means includes a conductive plate having an aperture, said platen and plate maintained at an identical potential level.

16. The ink jet printing system in accordance with claim 7 wherein each one of said plurality of shielding means is positioned to circumscribe a portion of one of said plurality of adjacent ink jet nozzles.

17. The ink jet printing system in accordance with claim 11 wherein each one of said plurality of shielding means includes a conductive cylinder, one end of said cylinder having an aperture passing through it, the other end of said cylinder being open, the open end circumscribing its respective ink jet nozzle, said aperture in alignment with a jet of said liquid imaging material drawn from the oriface of its respective ink jet nozzle.

18. An ink jet printing system comprising:

a plurality of adjacent ink jet nozzles; means for supplying a liquid imaging material to said plurality of ink jet nozzles;

a conductive platen positioned in spaced relation to said plurality of ink jet nozzles;

a recording member interposed between said conductive platen and said plurality of ink jet nozzles;

potential difference means for applying an electric field between at least one of said ink jet nozzles and said platen sufficient to generate a jet of said liquid imaging material from said at least one of said ink jet nozzles;

a plurality of shielding means corresponding in number to the plurality of ink jet nozzles, each one of said shielding means positioned in spaced relation between said recording member and a corresponding one of said plurality of adjacent ink jet nozzles, each of said shielding means for providing a potential barrier to an electric field between said adjacent ink jet nozzles and said platen and further for providing a potential barrier to static charges built up on said recording member; and wherein said platen and each one of said plurality of shielding means is maintained at a ground potential level and said potential difference means applies a potential difference in the range of approximately 2800 to 3200 volts negative with respect to said ground potential level between said at least one of said ink jet nozzles and said platen.

19. The ink jet printing system in accordance with claim 18 wherein each one of said plurality of shielding means is positioned to circumscribe a portion of one of said plurality of adjacent ink jet nozzles.

20. The ink jet printing system in accordance with claim 18 wherein each one of said plurality of shielding means and said platen are maintained at an identical potential level.

21. The ink jet printing system in accordance with claim 18 or 20 wherein each one of said plurality of shielding means includes a conductive cylinder, one end of said cylinder having an aperture passing through it, the other end of said cylinder being open, the length of each one of said cylinders being roughly the same as its diameter.

22. The ink jet printing system in accordance with claim 21 wherein each one of said conductive cylinders is positioned with its open end closest to the oriface of its respective ink jet nozzle.

23. The ink jet printing system in accordance with claim 18 wherein said potential difference means applies one of two voltage levels to said at least one of said ink jet nozzles, the first one of said two voltage levels being insufficient to cause jetting of said liquid imaging material from said at least one of said ink jet nozzles, the second voltage level being sufficient to cause jetting of said liquid imaging material from said at least one of said ink jet nozzles to said recording member.

24. The ink jet printing system in accordance with claim 18 or 20 wherein each one of said plurality of shielding means includes a conductive cylinder, one end of said cylinder having an aperture passing through it, the other end of said cylinder being open, the open end circumscribing its respective ink jet nozzle, said aperture in alignment with jet of said liquid imaging material drawn from the oriface of its respective ink jet nozzle.

25. An ink jet printing system comprising:

an ink jet nozzle;

means for supplying a liquid imaging material to said ink jet nozzle;

a conductive platen positioned in spaced relation to said ink jet nozzle;

a recording member interposed between said platen and said ink jet nozzle;

potential difference means, connected between said ink jet nozzle and said platen, for applying an electric field between said ink jet nozzle and said platen sufficient to generate a jet of said liquid imaging material from said ink jet nozzle;

potential barrier means, positioned in spaced relation between said recording member and said ink jet nozzle, for blocking charges built up on said recording member from influencing the electric field; and wherein said platen and said potential barrier means are maintained at a ground potential level and said potential difference means applies a potential difference in the range of approximately 2800 to 3200 volts negative with respect to said ground potential level between said ink jet nozzle and said platen.

26. An ink jet prining system comprising:

an ink jet nozzle;

means for supplying a liquid imaging material to said ink jet nozzle;

a conductive platen positioned in spaced relation to said ink jet nozzle;

a recording member interposed between said platen and said ink jet nozzle;

potential difference means, connected between said ink jet nozzle and said platen, for applying an electric field between said ink jet nozzle and said platen sufficient to generate a jet of said liquid imaging material from said ink jet nozzle, said potential difference means applying one of two voltage levels to said ink jet nozzle, the first voltage level being within the range of approximately 1800 to 2200 volts negative with respect to ground and being insufficient to generate the jet of said liquid imaging material from said ink jet nozzle, the second voltage level being within the range of approximately 2800 to 3200 volts negative with respect to ground and being sufficient to generate the jet of said liquid imaging material from said ink jet nozzle and draw said jet of liquid imaging material from the ink jet nozzle to said recording member; and potential barrier means, positioned in spaced relation between said recording member and said ink jet nozzle, for blocking charges built up on said recording member from influencing the electric field.

27. The ink jet printing system in accordance with claim 25 or 26 wherein:

said recording member is positioned in contact with said platen; and said platen and said potential barrier means are both maintained at a ground potential level.

28. The ink jet printing system in accordance with claim 25 or 26 wherein said potential barrier means includes a conductive plate having an aperture, the aperture in said plate positioned in alignment with the jet of said liquid imaging material from the nozzle such that said jet of liquid imaging material passes through said aperture and flies towards said recording member.

29. The ink jet printing system in accordance with claim 25 or 26 wherein said potential barrier means includes a conductive plate having an aperture, said platen and plate maintained at an identical potential level.

30. The ink jet system in accordance with claim 25 or 26 wherein said means for supplying a liquid imaging material supplies said liquid imaging material to said ink jet nozzle at a hydrostatic pressure such that a meniscus of said liquid imaging material forms at the tip of said ink jet nozzle.

31. The ink jet printing system in accordance with claim 1 or 2 or 3 or 4 or 5 or 6 or 14 or 15, wherein:

said recording member is positioned in contact with said platen; and said platen and said potential barrier means are both grounded.

32. The ink jet printing system in accordance with claim 1 or 4 or 5 or 6 or 14 or 15, wherein said potential difference means applies one of two non-zero voltage levels to said ink jet nozzle, the first voltage level being insufficient to generate the jet of said liquid imaging material from said ink jet nozzle, the second voltage level being sufficient to generate the jet of said liquid imaging material from said ink jet nozzle and draw said jet of liquid imaging material from the ink jet nozzle to said recording member.

* * * * *